United States Patent [19]
Horst et al.

[11] Patent Number: 5,701,064
[45] Date of Patent: Dec. 23, 1997

[54] ROTOR POSITION SENSING IN A DYNAMOELECTRIC MACHINE USING COUPLING BETWEEN MACHINE COILS

[75] Inventors: Gary E. Horst, Manchester; Alan P. French, Florissant, both of Mo.

[73] Assignee: Emerson Electric Co., St. Louis, Mo.

[21] Appl. No.: 549,457

[22] Filed: Oct. 27, 1995

[51] Int. Cl.⁶ ............................................. H02P 1/46
[52] U.S. Cl. ....................... 318/701; 318/778; 318/720; 310/10
[58] Field of Search ........................... 318/701, 254, 318/439, 138, 720, 798–815, 778; 310/10, 208, 168, 181, 51

[56] References Cited

U.S. PATENT DOCUMENTS

| | | | |
|---|---|---|---|
| 4,942,345 | 7/1990 | Horst | 318/254 |
| 5,111,096 | 5/1992 | Horst | 310/168 |
| 5,122,697 | 6/1992 | Horst | 310/181 |
| 5,239,217 | 8/1993 | Horst | 310/51 |
| 5,294,856 | 3/1994 | Horst | 310/181 |
| 5,386,162 | 1/1995 | Horst | 310/51 |
| 5,525,886 | 6/1996 | Lyons et al. | 318/701 X |
| 5,525,887 | 6/1996 | Van Sistine | 318/701 |
| 5,537,019 | 7/1996 | Van Sistine et al. | 318/701 |
| 5,552,685 | 9/1996 | Young et al. | 318/254 X |

*Primary Examiner*—Karen Masih
*Attorney, Agent, or Firm*—Polster, Lieder, Woodruff & Lucchesi

[57] ABSTRACT

A polyphase dynamoelectric machine (10) such as a switched reluctance motor has a stator assembly (12) and a rotor assembly (14). The rotor assembly is movable with respect to the stator assembly. The stator assembly includes a stator (16) having a plurality of stator poles (18). The rotor assembly includes a rotor (20) having a plurality of rotor poles (22). The stator assembly further includes a plurality of separately energizable stator windings (24) associated with the respective machine phases. These stator windings are energized and de-energized in a predetermined sequential manner to sequentially activate and deactivate the machine phases. Energization and de-energization of the respective stator windings is at least partially determined as a function of the machine's instantaneous rotor position. The machine includes a processor (26) for determining the rotor position. The processor monitors the waveform of a circulating current coupled from an energized stator winding for an active machine phase into a de-energized stator winding for an inactive machine phase. Respective energized and de-energized stator windings are interconnected to form a closed circuit path by which the current in the energized stator winding is coupled into the de-energized stator winding. Monitoring the resultant current waveform provides an indication of rotor position, and the processor uses this information to energize and de-energize the stator windings.

35 Claims, 4 Drawing Sheets

ROTOR POSITION SENSING IN A DYNAMOELECTRIC MACHINE USING COUPLING BETWEEN MACHINE COILS

BACKGROUND OF THE INVENTION

This invention relates to dynamoelectric machines such as polyphase switched reluctance motors, and more particularly, to the sensing of rotor position in such a machine when a circulating currents in machine phase windings, the characteristics of the circulating currents being a function of the inherent structural features of the machine.

Dynamoelectric machines such as switched reluctance motors comprise a rotor assembly and a stator assembly with respect to which the rotor assembly is movable. The machine may be a polyphase machine having 2, 3, 4, or 5 phases, for example. For such machines, the stator assembly includes a plurality of phase windings which are energized in a particular sequence depending upon the type of machine usage. The stator assembly includes a plurality of inwardly salient teeth spaced about the inner circumference of the stator assembly. The rotor includes a plurality of outwardly salient rotor teeth. Inherent in the construction of the motor are a wide variety of features. For example, the number of stator teeth may equal the number of stator teeth. Also, the width of the respective rotor and stator teeth may differ. There is also usually a defined air gap between the rotor teeth and the stator teeth. This gap should be uniform about the perimeter of the stator and rotor assemblies. However, in actuality, there are usually variations in the air gap which can be discerned when the rotor teeth sweep past the stator teeth during machine operation. Stator windings are to be fitted so they span a stator tooth. This may be arranged so portions of adjacent windings are side-by-side in a stator slot. Or, a winding may be arranged one above the other. The physical structure of a motor which result from the above, in addition to the size and shape of machine stator and rotor laminations, creates an inherent electro-magnetic environment within the motor. Further, this environment varies as the motor is switched between phases. That is, if the air gap is slightly wider or narrower at one orientation then at another, the electro-magnetic environment for that set of conditions will differ from what is at a different rotor/stator orientation.

During operation of the machine, sequential energization and de-energization of the machine phases is, in part, a function of the instantaneous rotor position. As a consequence, many of the control strategies currently employed for machine control utilize a rotor position sensor which provides an output to a control electronics indicating rotor position. The electronics processes this information and produces control signals which are supplied to the stator windings to energize and de-energize these windings.

While the various control strategies work well to provide the desired machine control, they do have certain drawbacks. Sensors fail. If one does, then the performance of the motor may be significantly degraded; the motor may become inoperative, or the motor's performance is much less efficient than it otherwise could be. In addition, sensors take up space within a motor housing as does their associated wiring. And, sensors add to the cost of the motor. Depending upon the level of motor control required to perform a particular function, this cost can represent an appreciable portion of the motor's cost. If it were possible to obtain rotor position information without use of a sensor, certain cost and performance advantages would be realized. Not only would the cost of the transducer be eliminated, but so would the associated wiring and installation costs for the sensor. Further, implementation of the control strategy would be changed and the result may require fewer calculations. This would enhance response time of the control system and consequently, the motor.

SUMMARY OF THE INVENTION

Among the several objects of the present invention may be noted the provision of a dynamoelectric machine such as a polyphase switched reluctance motor having a rotor assembly and a stator assembly, the stator assembly including a plurality of stator windings which are separately energizable to energize respective machine or motor phases;

the provision of such a dynamoelectric machine in which rotor position sensing is used for controlling energization and de-energization of stator windings and switching between machine phases;

the provision of such a dynamoelectric machine in which rotor position is monitored without the use of rotor position sensors;

the provision of such a dynamoelectric machine having a mutually coupled closed circuit path between an active or energized phase winding and other, and inactive or de-energized phase windings;

the provision of such a dynamoelectric machine in which a current flowing in an active phase is induced into and also circulates in a closed circuit path formed by the machine's phase windings;

the provision of such a dynamoelectric machine in which the characteristics of the current may vary depending upon which machine phase is active at any one time;

the provision of such a dynamoelectric machine in which current and voltage waveforms are monitored to determine rotor position;

the provision of such a dynamoelectric machine in which additional electrical leads are extended from the respective stator windings so the current paths can be connected in a preferred circuit arrangement, this arrangement being parallel or series-parallel;

the provision of such a dynamoelectric machine in which rotor position indication is a function of the eccentricity between the rotor assembly and stator assembly and the resulting variation in the air gap between one or more rotor teeth and an associated stator teeth, and adjacent rotor teeth and their associated stator tooth as the rotor teeth sweep past the stator teeth during machine operation;

the provision of such a dynamoelectric machine in which rotor position information can also be produced as a result of varying the number of turns in various phase windings, or changing the resistance in one phase winding compared to that of another, or varying the position of phase windings in stator slots;

the provision of such a dynamoelectric machine in which a computation based upon information obtained from the coupled currents provides the necessary information for energizing and de-energizing a phase;

the provision of such a dynamoelectric machine which is a switched reluctance motor which does not require a rotor position sensor but simply employs extra wires extending out of the motor which, when properly connected produces a sufficiently robust waveform signature that the waveform can be processed to produce rotor position information;

the provision of such a dynamoelectric machine in which a voltage induced in a closed circuit path can also be monitored to provide rotor position information; and, the provision of such a dynamoelectric machine which is a less costly, more reliable machine than a comparable machine employing rotor position sensors without there being any appreciable degradation in the level of machine control.

In accordance with the invention, generally stated, a polyphase dynamoelectric machine has a stator assembly and a rotor assembly. The rotor assembly is movable with respect to the stator assembly. The stator assembly includes a stator having a plurality of stator poles, and the rotor assembly includes a rotor having a plurality of rotor poles. The stator assembly further includes a plurality of separately energizable stator windings associated with the respective machine phases. These stator windings are energized and de-energized in a predetermined sequential manner to sequentially activate and deactivate the machine phases. Energization and de-energization of the respective stator windings is determined, at least partially, as a function of the machine's instantaneous rotor position. The machine includes a processor for controlling energization and de-energization of a machine phase at least partially as a function of this instantaneous rotor position. A current flowing in an active or energized stator winding is coupled from this stator winding into de-energized stator windings for an inactive machine phases. The respective energized and de-energized stator windings form a closed circuit path in which current in the energized stator winding is coupled into the de-energized stator windings. The processor derives information from the resultant current waveform which provides an indication of rotor position. The processor uses this information to energize and de-energize the stator windings accordingly. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
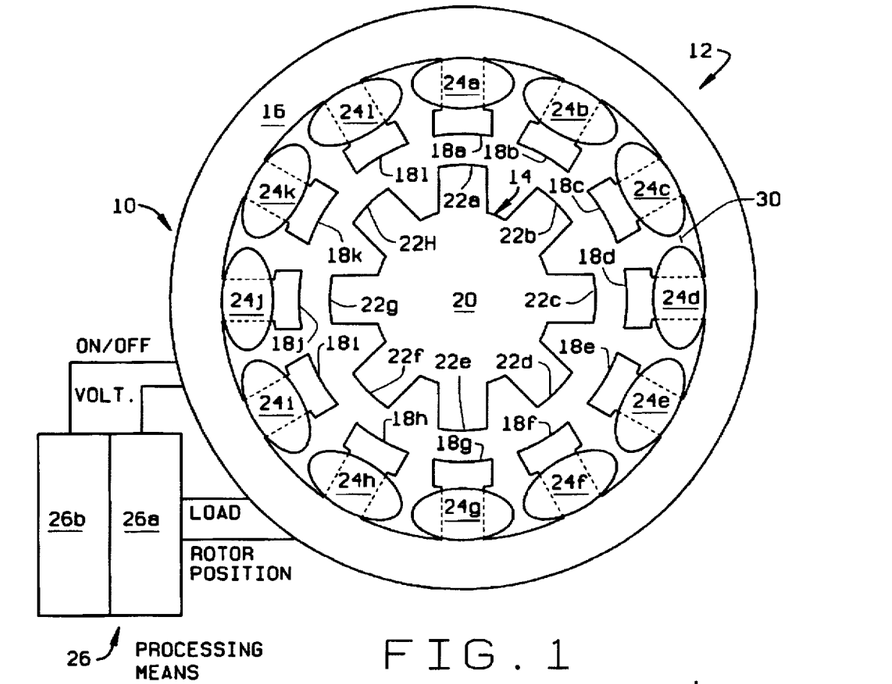
FIG. 1 is a representational view of a polyphase, switched reluctance motor and a control unit for controlling switching of the motor phases.

Referring to the drawings, a dynamoelectric machine such as a polyphase switched reluctance motor or SRM is indicated generally 10 in FIG. 1. Typically, the motor will have between two (2) and five (5) phases. Motor 10 includes a stator assembly 12 and a rotor assembly 14. The rotor assembly is movable with respect to the stator assembly. Stator assembly 12 includes a stator 16 having a plurality of stator poles 18. As shown in FIG. 1, stator 16 has twelve (12) such stator poles indicated 18a–18l. Rotor assembly 14 includes a rotor 20 which has a plurality of rotor poles 22. In FIG. 1, rotor 20 is shown to have eight (8) rotor poles indicated 22a–22h. Stator assembly 12 also has a plurality of separately energizable stator windings 24a–24l associated with the respective machine phases.

In operation, windings for each of the respective motor phases are sequentially energized and de-energized. For this purpose, a processing means 26 is responsive to a variety of motor operating parameters such as load, frequency, line voltage, current, etc., to determine when a particular winding is to be energized to activate a motor phase, and then subsequently de-energized when the phase becomes inactive. Means 26 includes a first section 26a for receiving and processing this parametric information, and a section 26b for providing an appropriate output to control winding energization and de-energization. One factor which at least partially determines when phase switching should occur is the instantaneous position of rotor 20. Heretofore, motors have required some type of sensor to monitor rotor position and provide an output signal to a processing electronics as to its location. The operating environment of many motors used in appliance or industrial applications cause sensor performance to degrade or sometimes fail. The result is a degradation in motor performance. While this degradation does not mean that the motor or dynamoelectric machine would quit, the operating efficiency of the machine or motor could be lessened. It is an important feature of the present invention to provide a polyphase motor in which rotor position is readily ascertained without use of a rotor position sensor so that the information is readily available for machine control purposes. The ability to provide this information without use of a sensor at the time reduces the cost of the machine and improves its reliability.

Figure 4A:
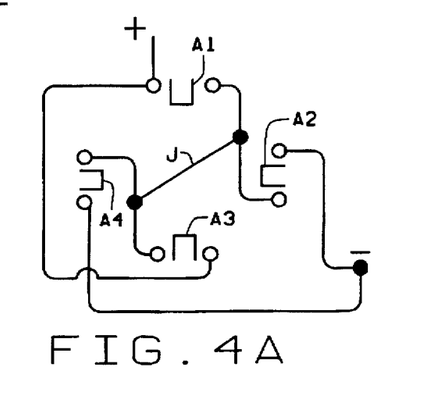
FIG. 4A is a schematic diagram illustrating the coil connections for one phase of the motor of FIG. 3.
Figure 4B:
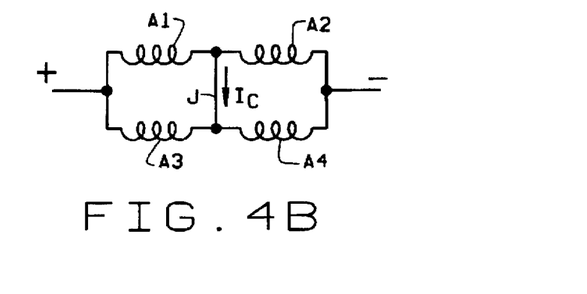
FIG. 4B is a simplified schematic of the coil connections.
Figure 5:
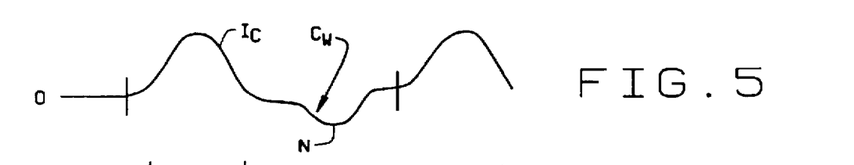
FIG. 5 is a representation of a current waveform in jumper J (FIG. 4B)
Figure 6:
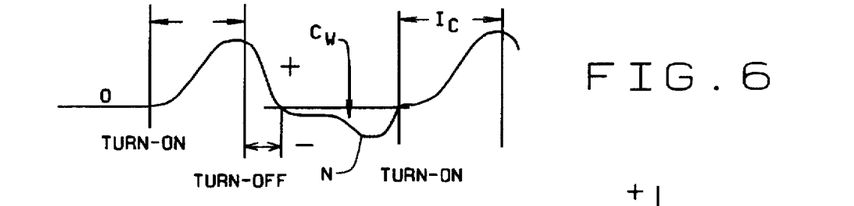
FIG. 6 illustrates which portions of the current waveform of FIG. 5 are produced when a motor phase is turned on and turned off.

In accordance with the invention, processing means 26 is now responsive to a current waveform (see FIGS. 5 and 6) in a jumper J or J' (see FIGS. 4A, 4B, 8B, 10B, and 11). As shown in FIGS. 5 and 6, the current waveform is comprised of two components. One component $I_c$ is the result of a motor phase with which jumper J is associated being active. The other component $C_w$ is the result of unbalanced or imbalanced coil voltages induced by mutual coupling to the other active motor phases. This imbalance results from a number of potential factors as described hereinafter. Means 26a, processes the $I_c$ and $C_w$ waveforms to obtain rotor position information.

This information is then used by means 26b to control energization and de-energization of the stator windings by switching current flow to the respective windings on and off.

It is also important to realize that the characteristics of the waveform are a function of the intrinsic structure of the stator, the stator windings, and the rotor. As discussed hereinafter, certain structural modifications to the stator assembly or rotor assembly can be made which would enhance the waveform characteristics. However, importantly, each motor construction results in a waveform whose characteristics can be used for determining rotor position, for example.

Figure 2:
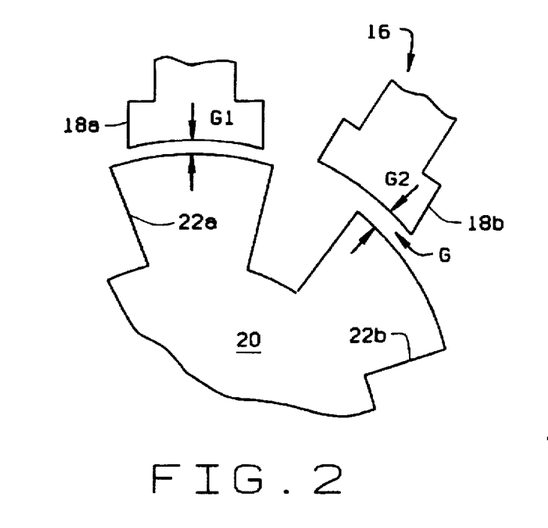
FIG. 2 is a partial view of the stator assembly and rotor assembly of the motor illustrating two adjacent stator teeth and rotor teeth and the difference in the air gap between the teeth.

Referring to FIG. 2, as rotor 20 turns, the respective rotor poles sweep past the stator poles. In the Fig., rotor pole 22a is shown sweeping past stator pole 18a, and rotor pole 22b past stator pole 18b. The outer circumference of the rotor, as defined by the outer end of the respective rotor poles is slightly smaller than the inner circumference of the stator, as defined by the outer ends of the stator poles. As a result, there is an air gap G formed between the rotor and the stator. Ideally, the air gap is uniform about the circumference of the rotor and stator. In reality, it is not. Rather, as shown in FIG. 2, an air gap G1 between respective stator and rotor teeth 18a and 22a, is of a different width than a gap G2 between teeth 18b and 22b. In investigating the effects of this non-uniformity, it has been found that a current waveform $C_w$ resulting from current flow in an energized phase winding and coupled into the non-energized or de-energized windings has a current signature. Further, it has been found that this current signature can be used to detect rotor position. As a result, there is no need for a separate rotor sensor to be incorporated into the machine or machine housing.

Figure 3:
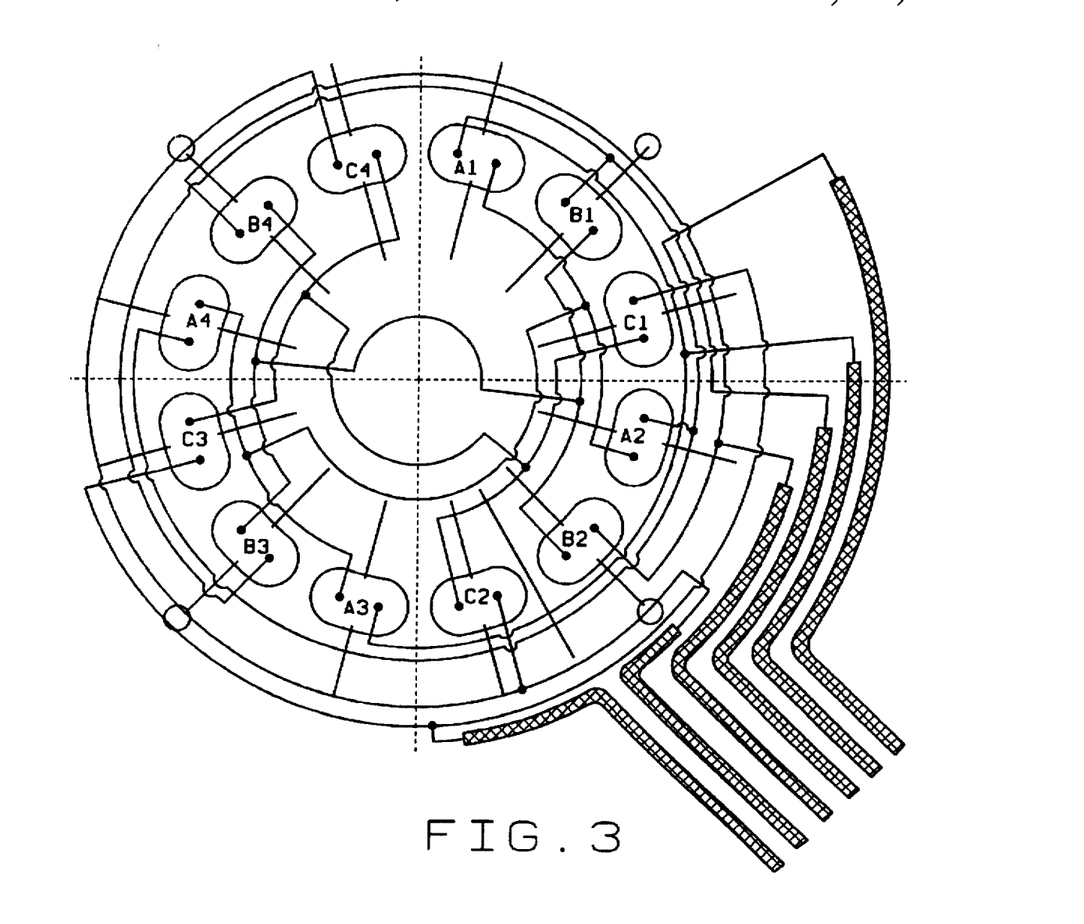
FIG. 3 is a representative wiring diagram for a polyphase motor.

Referring to FIG. 3, a representative wiring diagram for a motor 10 is shown. In this example, motor 10 is a three-phase motor having respective phases A–C. In FIG. 4A, a simplified wiring diagram for one set of phase windings is shown. There are four phase windings A1–A4. As shown in FIG. 4B, coils A1–A2 are series connected, as are coils A3 and A4. The series connected coils A1–A2 are connected in parallel with the series connected coils A3–A4. The invention includes at least one jumper wire J connected between the commonly connected ends of coils A1 and A2, and the commonly connected ends of coils A3 and A4 to form a series-parallel circuit of the stator windings.

As shown in FIG. 6, when a phase winding 18 is energized, the current in the winding rises to a peak current valve which is, for example, 6 amps. When the winding is de-energized, the current in the winding decays. There is then an interval in which there is no direct current flow into the winding. This is because other windings for other motor phases are being energized in their normal sequence. At the appropriate time in the motor operating sequence, the phase winding is again energized and the cycle repeated.

In viewing the current waveform $C_w$, it will be noted that the waveform signature or characteristics include a pronounced indentation N in the portion of the current waveform during which the phase winding is de-energized.

It has been found that this portion of the waveform is produced by mutual coupling between the winding representing this inactive phase, and the energized phase winding representing the currently active phase. Importantly, it has further been found that the position of this indentation is representative of the instantaneous rotor position relative to the motor phase. This is significant because, if the current waveform $C_w$, including the indentation is sufficiently robust, the waveform, when processed by processing means 26 provides desired rotor position information. This means motor 10 can be a sensorless motor, with respect to sensing rotor position; while at the same time, providing the appropriate information necessary for phase activation and de-activation.

One of the factors present in the creation of the current waveform $C_w$ is the noted eccentricity in the air gap G about the mutual circumference between the rotor and stator. In a closed winding configuration such as represented by the schematic FIG. 4B, the negative current indentation N is formed by the mutually shared flux between the active phase and the other inactive phases. It is important to understand that regardless of which phase A—C is active, there is a mutual coupling between the current flow in the coil windings for the active phase, and the coil windings for each of the other inactive phases. And, the resulting current $I_c$ flowing through jumper J can be routed to the processing means by bringing a pair of leads out of the motor to an appropriate input of the processing means. No other connection is required. And, the rotor position information derived from processing current waveform $C_w$ is available regardless of whether a particular phase is active or inactive at any given time.

Figure 7A:
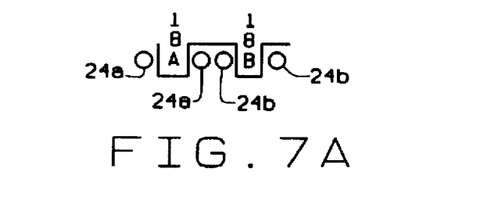
FIG. 7A and 7B illustrate different types of winding placements in stator slots.
Figure 7B:
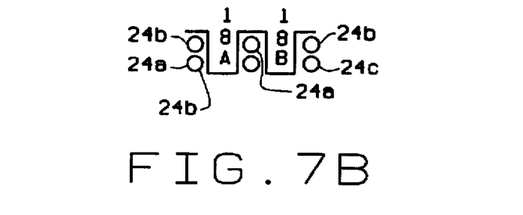
Figure 7C:
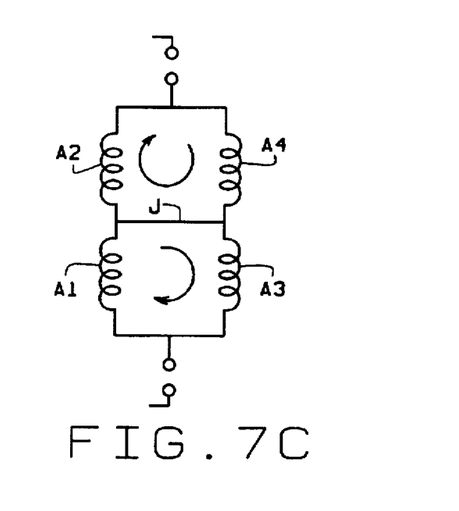
FIG. 7C illustrates a winding arrangement in which one coil has fewer windings then other coils.

It will be appreciated that processing means 26 can include any of a variety of processing capabilities to enhance the indentation N portion of the current waveform in the signal intensity is sufficiently robust to insure that the desired rotor position information can be derived. In addition to this, other approaches to accomplish the same result would be to establish a set differential in air gap about the circumference of the stator rotor. Another factor is the stator coil installation. For example, the side-to-side arrangement shown in FIG. 7A provides a different set of conditions than for a lineal arrangement as shown in FIG. 7B. Also, as shown in FIG. 7C, one of the windings A3 could have a coil left off, for example, so there is a difference in the number of coils in the different windings. In addition, the windings could be formed of wire having different resistance values. Or, again referring to FIGS. 7A and 7B, the width of the respective stator teeth 18a or 18b or the rotor teeth 22 could be varied.

Figure 8A:
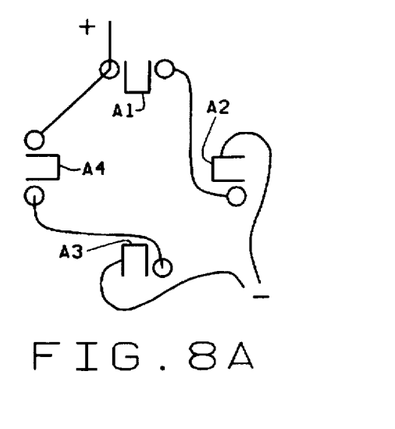
FIGS. 8A and 8B illustrate an alternate coil connection arrangement and its equivalent circuit.
Figure 8B:
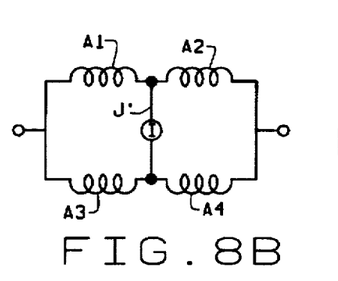
Figure 9A:
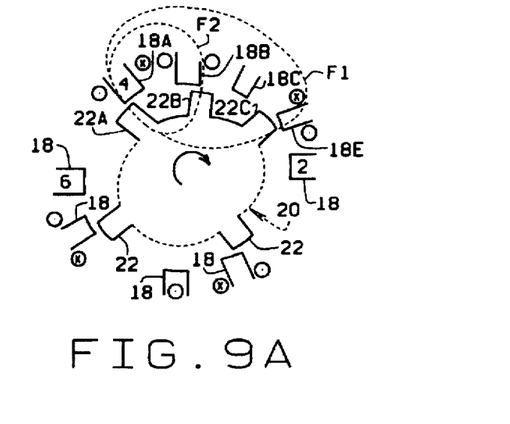
FIG. 9A is a representation of the motor illustrating mutual coupling between coils and FIG. 9B is a schematic representation of how coupling occurs.
Figure 9B:
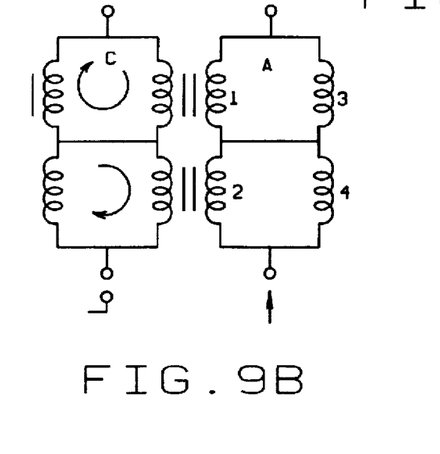

Referring to FIGS. 8A and 8B, other winding connections, besides that discussed with respect to FIG. 4A can also be effected to achieve the same desired result. Again, as shown in FIG. 8B, a series-parallel circuit is formed by which a closed winding arrangement of coils is formed. Regardless of the circuit configuration, as shown in FIGS. 9A and 9B, a flux path F1 is created as a rotor pole 22a sweeps past a stator pole 18a. This flux path extends from the stator tooth 18a associated with one coil 24a of one motor phase, across the air gap between the stator and rotor, through the rotor tooth 22a moving past the stator tooth, through the rotor, through rotor tooth 22e and back across the air gap between the stator and rotor at the location of the stator tooth 18e of the activated phase, etc. At the same time, there is a second flux path F2 which extends between the stator tooth 18a and rotor tooth 11a, and through rotor tooth 22a into stator tooth 22b. Whereas, the windings 24a and 14e are energized motor windings, the stator winding 24b associated with stator tooth 18b is not. Though not shown, it will be understood that other flux paths associated with the other de-energized motor phases also exist. The result is as shown in FIG. 9B in which a circulating current is produced in the coupled coils. It will be noted that the peak induced current, the negative current portion of the waveform in FIG. 5, occurs at or about the minimum inductance portion of the active motor phase. Also, a different voltage is imposed through the coupling on each coupled coil for the inactive motor phases.

Figure 10A:
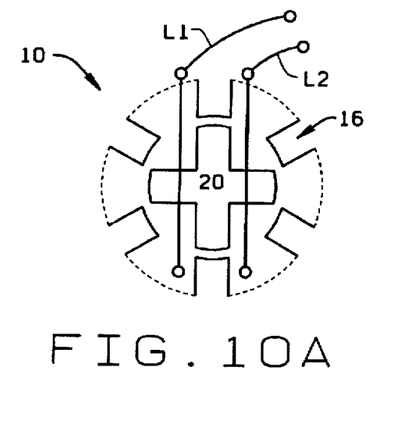
FIG. 10A is a simplified representation of the motor with two coils per phase connected in parallel.
Figure 10B:
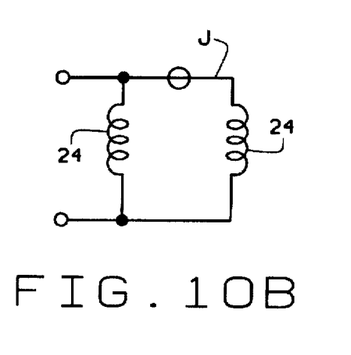
FIG. 10B is a schematic representation of the resulting circuit.

According to the invention therefore, it is first important that the motor windings form a closed loop. This loop can take the form of any parallel or series-parallel circuit arrangement. Series-parallel arrangements are such as shown in FIGS. 4B and 8B. A parallel arrangement is as shown in FIG. 10B. Once such a closed loop configuration is established, then by bringing electrical leads L1, L2 out of the motor, the current waveform $C_w$ can be evaluated by processing means 26, together with any other pertinent motor operating information, to control current flow to the windings and phase switching. This, as discussed above, results from some type of motor asymmetry (air gap variance, for example) so an induced current is forced or coupled into the de-energized phase windings.

Figure 11:
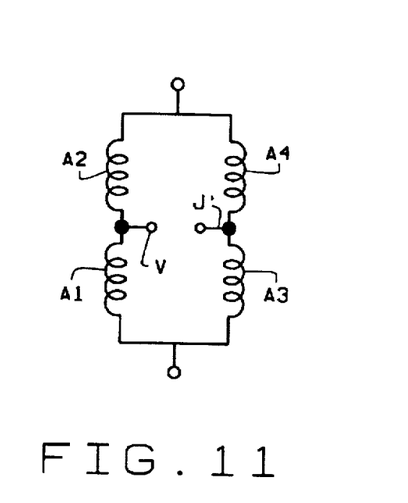
FIG. 11 is a schematic of an equivalent circuit of one series-parallel coil set for a motor in which voltage sensing is used to obtain rotor position information.
Figure 12:
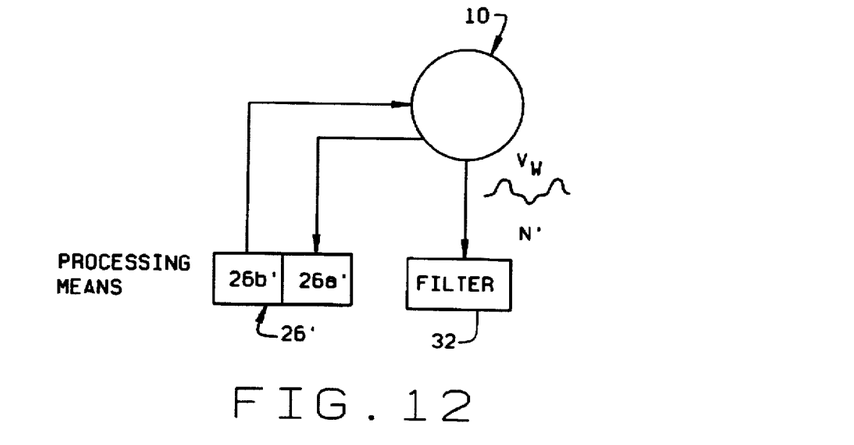
FIG. 12 is a block diagram of an alternate embodiment of the invention in which a voltage waveform is used for rotor position sensing.

In addition to using the current waveform for rotor position sensing, in accordance with the teachings of the present invention, it is also possible to use a voltage waveform $V_w$ for this purpose. As shown in FIG. 12, dynamoelectric machine 10 employs a filter 32 through which the voltage waveform is supplied to a processing means 26'. The filter is used because the voltage waveform has been found to be much noisier than the corresponding current waveform. Accordingly, the filter is a noise filter used to produce a voltage waveform having an indentation N' sufficiently robust for the processing means to derive the rotor position information from it. In FIG. 11, a series-parallel circuit forming a closed loop of motor windings for motor phases A–C is shown to include a jumper J' across which the voltage waveform is sensed.

What has been described is a dynamoelectric machine such as a polyphase switched reluctance motor which has a rotor assembly and a stator assembly. The stator assembly includes a plurality of stator windings which are separately energizable to energize respective machine phases. Rotor position sensing is used for controlling energization and de-energization of the stator windings to control switching between machine phases, rotor position being monitored without the use of sensors. The dynamoelectric machine has a mutually coupled closed path between an active machine phase and each of the other, inactive phases, the resulting current flowing through a closed path being monitored to determine rotor position. Additional leads are extended from the respective stator windings and are connected in parallel or series-parallel with the stator windings. Rotor position indication is a function of the eccentricity between the rotor assembly and stator assembly, and the resulting variation in the air gap between one rotor tooth and an associated stator tooth, and an adjacent rotor tooth and its associated stator tooth. It is also a function of the imbalance between mutually induced voltages in the coils in the closed winding paths. Besides the above, the waveform characteristics from which rotor position indication is derived can also be a function of the respective number of coils in the phase windings, differences in the winding resistance, and placement of stator windings in stator slots. A computation based upon information obtained from the coupled currents provides the necessary information for energizing and de-energizing a machine phase winding. The voltage induced in the closed paths can also be used to indicate rotor position, but the relationship between the induced voltage and phase angle is non-linear with respect to current. Also, the voltage signal is noisy and therefore requires filtering in order to obtain a usable signal. The result is a dynamoelectric machine which is a less costly, more reliable machine than a comparable machine employing sensors, and without any degradation in the level of machine control.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A polyphase dynamoelectric machine having a stator assembly and a rotor assembly which is movable with respect to the stator assembly, the stator assembly including a stator having a plurality of stator poles and the rotor assembly including a rotor having a plurality of rotor poles, the stator assembly further including a plurality of separately energizable stator windings associated with respective machine phases, the stator windings being energized and de-energized in a predetermined sequential manner to sequentially activate and deactivate the machine phases, the energization and de-energization of the respective stator windings being determined at least partially as a function of the instantaneous rotor position, and said machine including means for determining an instantaneous rotor position by measuring a circulating current coupled from an energized stator winding for an active machine phase into a de-energized stator winding for an inactive machine phase, the respective energized and de-energized stator windings being interconnected to form a closed circuit path by which the circulating current in the energized stator winding is coupled into the de-energized stator winding, and said means monitoring the resultant circulating current waveform for an indication of rotor position.

2. The dynamoelectric machine of claim 1 wherein said stator windings of one machine phase are connected together with said stator windings of the other machine phases to form a closed circuit path for the circulating current, and said means includes a jumper wire connected between respective stator windings to form a series-parallel circuit of stator windings.

3. The dynamoelectric machine of claim 2 wherein the respective outer ends of said stator poles and said rotor poles are adjacent one another with a defined air gap therebetween, the width of said air gap being non-uniform around a circumference of said stator and rotor with the non-uniformity in air gap width resulting in a characteristic in a circulating current waveform which is produced during a machine phase, said characteristic representing an instantaneous rotor position with respect to whichever machine phase is active at that time.

4. The dynamoelectric machine of claim 3 wherein said means processes said circulating current waveform and utilizes rotor position information derived therefrom to control energization and de-energization of said stator windings.

5. The dynamoelectric machine of claim 2 wherein one of the phase windings has a different number of coils than the other phase windings with the non-uniformity in coils between the phase windings producing a characteristic in a circulating current waveform indicative of rotor position.

6. The dynamoelectric machine of claim 2 wherein the electrical resistance of one of the phase windings is different than the electrical resistance of the other phase windings with a difference in the phase winding resistances producing a characteristic in a circulating current waveform indicative of rotor position.

7. A polyphase switched reluctance motor comprising:
a stator assembly including a stator having a plurality of stator poles and a plurality of separately energizable stator windings associated with the respective motor phases;

a rotor assembly movable with respect to the stator assembly and including a rotor having a plurality of rotor poles;

means for energizing and de-energizing said stator windings in a predetermined manner to sequentially activate and deactivate the motor phases, energization and de-energization of the respective stator windings being a function of the instantaneous rotor position; and, means for processing a circulating current coupled from an energized stator winding for an active machine phase into a de-energized stator winding for an inactive machine phase to ascertain an instantaneous rotor position, the respective energized and de-energized stator windings being interconnected to form a closed circuit path in which circulating current in an energized stator winding is coupled into a de-energized stator winding, and said means for processing processing a resultant circulating current waveform for an indication of rotor position.

8. The switched reluctance motor of claim 7 wherein said stator windings of one motor phase are connected together with said stator windings of the other motor phases to form a closed circuit path.

9. The switched reluctance motor of claim 8 wherein said circuit path is a parallel circuit path and said measuring means includes a jumper wire connected between respective stator windings to form a series-parallel circuit with the stator windings.

10. The switched reluctance motor of claim 9 wherein respective outer ends of said stator and rotor poles are adjacent one another with an air gap formed therebetween, the width of said air gap being non-uniform about a circumference of said stator and rotor, said non-uniformity producing a characteristic in a resulting circulating current waveform for a motor phase, said characteristic representing an instantaneous rotor position with respect to the motor phase active at that time.

11. The switched reluctance motor of claim 10 wherein said means for processing processes said current waveform including said characteristic and utilizes rotor position information derived therefrom to control energization and de-energization of said stator windings to activate and deactivate said motor phases.

12. The switched reluctance motor of claim 9 wherein one of the phase windings has a different number of coil turns than the other phase windings, the non-uniformity in windings producing a characteristic in a resulting circulating current's waveform which is indicative of rotor position.

13. The switched reluctance motor of claim 9 wherein one phase winding has a different electrical resistance than the electrical resistance of the other phase windings, the difference in electrical resistance resulting in a characteristic in a resulting circulating current waveform which is indicative of rotor position.

14. An electric motor comprising:

a stator assembly including a stator having a plurality of stator poles and a plurality of stator windings;

a rotor assembly movable with respect to said stator assembly and including a rotor having a plurality of rotor poles;

means for energizing and de-energizing said stator windings as a function of an instantaneous rotor position, the respective outer ends of said stator poles and said rotor poles being adjacent one another with an air gap formed therebetween, a width of said air gap being non-uniform about a circumference of said stator and rotor with said non-uniformity producing a characteristic in a resulting circulating current waveform of said motor, said characteristic representing an instantaneous rotor position; and, means for processing said circulating current waveform for ascertaining said instantaneous rotor position to determine when said stator windings are energized and de-energized.

15. The motor of claim 14 which is a polyphase switched reluctance motor.

16. The motor of claim 15 wherein said stator windings are separately energizable stator windings associated with respective motor phases, said stator windings being energized and de-energized in a predetermined manner to sequentially activate and deactivate said motor phases with energization and de-energization of respective stator windings being a function of the instantaneous rotor position, said means for processing processing a circulating current coupled from an energized stator winding for an active motor phase into a de-energized stator winding for an inactive motor phase, the respective energized and de-energized stator windings being interconnected to form a closed winding path by which a circulating current in an energized stator winding is coupled into a de-energized stator winding.

17. The motor of claim 16 wherein said stator windings of one motor phase are connected together with said stator windings of said other motor phases and form a parallel, closed winding path.

18. The motor of claim 17 further including a jumper wire connected between respective stator windings to form a series-parallel winding path with said stator windings, said means for processing ascertaining said circulating current waveform characteristic from a circulating current coupled from an energized stator winding in said winding path into said de-energized stator windings therein.

19. In a polyphase dynamoelectric machine having a stator assembly and a rotor assembly movable with respect to the stator assembly, said stator assembly including a stator having a plurality of stator poles and said rotor assembly including a rotor having a plurality of rotor poles, said stator assembly also including a plurality of separately energizable stator windings associated with respective machine phases, said stator windings being energized and de-energized in a predetermined manner to sequentially activate and deactivate machine phases, and energization and de-energization of said stator windings being a function of rotor position, means for determining an instantaneous rotor position by monitoring a circulating current waveform produced by a circulating current coupled from an energized stator winding for an active machine phase into a de-energized stator winding for an inactive machine phase, said respective energized and de-energized stator windings forming a closed circulating circuit path by which circulating current in said energized stator winding is coupled into said de-energized stator winding with the resultant circulating current waveform having a current characteristic indicative of rotor position, said means processing said current waveform and utilizing rotor position information derived therefrom to control energization and de-energization of said stator windings.

20. The dynamoelectric machine of claim 19 wherein said stator windings for the respective machine phases form a circuit in which said stator windings are interconnected to form a closed circuit for the circulating current, said means including a jumper wire connected between respective stator windings to form a series-parallel circuit.

21. The dynamoelectric machine of claim 20 wherein the respective outer ends of said stator poles and said rotor poles are adjacent one another and air gap is formed therebetween, the width of said air gap being non-uniform about a circumference of said stator and rotor, the non-uniformity in air gap width producing said characteristic in a circulating current waveform produced in a machine phase, said characteristic representing an instantaneous rotor position with respect to whichever machine phase is active at that time.

22. In a polyphase dynamoelectric machine having a stator assembly and a rotor assembly movable with respect to the stator assembly, said stator assembly including a stator having a plurality of stator poles and said rotor assembly including a rotor having a plurality of rotor poles, said stator assembly also including a plurality of separately energizable stator windings associated with respective machine phases, said stator windings being energized and de-energized in a predetermined manner to sequentially activate and deactivate machine phases, and energization and de-energization of said stator windings being a function of rotor position, the improvement comprising means determining an instantaneous rotor position by monitoring a voltage waveform produced by coupling between an energized stator winding for an active machine phase and a de-energized stator winding for an inactive machine phase, said respective energized and de-energized stator windings forming a closed circuit path by which said voltage coupling is produced, the resultant voltage waveform having a characteristic indicative of rotor position, said means processing said voltage waveform and utilizing rotor position information derived therefrom to control energization and de-energization of said stator windings.

23. The improvement of claim 22 further including filter means interposed between said circuit path and said rotor position determining means for filtering noise present in said voltage waveform before said voltage waveform is processed.

24. In a polyphase dynamoelectric machine having a stator assembly and a rotor assembly movable with respect to the stator assembly, said stator assembly including a stator having a plurality of stator poles and said rotor assembly including a rotor having a plurality of rotor poles, said stator assembly also including a plurality of separately energizable stator windings associated with respective machine phases, said stator windings being energized and de-energized in a predetermined manner to sequentially activate and deactivate machine phases, and energization and de-energization of said stator windings being a function of rotor position, a method for determining an instantaneous rotor position in order to successively energize and de-energize stator windings for respective phases comprising:

forming a closed circuit path with said stator windings;

circulating a current through a stator winding for an active machine phase;

coupling said circulating current into at least one of said de-energized stator windings to produce a resultant circulating current waveform having a waveform characteristic indicative of rotor position; and, processing said current waveform and utilizing rotor position information derived therefrom to control energization and de-energization of said stator windings.

25. The method of claim 24 wherein forming a closed circuit path with said stator windings includes forming a series-parallel circuit in which said stator windings are connected and forming said stator and rotor so there is a non-uniform air gap therebetween producing the characteristic in said current waveform indicative of rotor position.

26. A method of controlling switching between phases in a polyphase switched reluctance motor having a stator assembly with a plurality of stator poles and a plurality of separately energizable stator windings associated with respective machine phases, and a rotor assembly movable with respect to the stator assembly and including a rotor having a plurality of rotor poles, said stator windings being energized and de-energized in a predetermined manner to sequentially activate and deactivate motor phases, energization and de-energization of said stator windings being a function of rotor position, the method comprising:

forming a closed circuit path with said stator windings;

coupling a circulating current flowing in an energized stator winding into at least one of said de-energized stator windings to produce a resultant current waveform having a waveform characteristic indicative of rotor position; and, processing said current waveform and utilizing rotor position information derived therefrom to determine an instantaneous rotor position.

27. The method of claim 26 wherein forming a closed circuit path with said stator windings includes forming a series-parallel circuit in which said stator windings are connected.

28. The method of claim 27 further including forming said stator and rotor so there is a non-uniform air gap therebetween, the characteristic in said current waveform being resulting from said non-uniformity.

29. The method of claim 27 further including forming one of the respective phase windings with a different number of coil turns than the other phase windings with the non-uniformity in coil turns producing said characteristic in said current waveform indicative of rotor position.

30. The method of claim 27 further including forming one of the phase windings to have a different electrical resistance than the other phase windings, the non-uniformity in winding resistance producing said characteristic in said current waveform indicative of rotor position.

31. The method of claim 27 further including positioning the windings of one phase in slots of the stator differently than the windings of the other phases for the resulting non-uniformity in winding positioning to produce said characteristic in said current waveform indicative of rotor position.

32. A method of controlling switching between phases in a polyphase switched inductance motor having a stator assembly with a plurality of stator poles and a plurality of separately energizable stator windings associated with respective machine phases, and a rotor assembly movable with respect to the stator assembly and including a rotor having a plurality of rotor poles, the respective outer ends of said stator poles and said rotor poles being adjacent one another with an air gap formed therebetween, said stator windings being energized and de-energized in a predetermined manner to sequentially activate and deactivate motor phases, energization and de-energization of said stator windings being a function of rotor position, the method comprising:

forming a closed circuit path with said stator windings;

coupling a circulating current flowing in an energized stator winding into at least one of said de-energized stator windings to produce a resultant current waveform, the width of said air gap being non-uniform about the circumference of said stator and rotor and this non-uniformity in air gap width producing a characteristic in said current waveform representing an instantaneous rotor position with respect to whichever machine phase is active at that time;

processing said current waveform and utilizing rotor position information derived therefrom to determine an instantaneous rotor position; and, successively energizing and de-energizing stator windings for the respective motor phases as a function of the rotor position.

33. The method of claim 32 wherein coupling a circulating current flowing in an energized stator winding into at least one of said de-energized stator windings produces a resultant voltage waveform, the non-uniformity of air gap width producing a characteristic in said voltage waveform representing the instantaneous rotor position, and processing of a waveform includes processing said voltage waveform and utilizing rotor position information derived therefrom to determine an instantaneous rotor position.

34. A polyphase switched reluctance motor comprising:

a stator assembly including a stator having a plurality of stator poles and a plurality of stator windings which are separately energizable stator windings associated with respective motor phases, said stator windings being energized and de-energized in a predetermined manner to sequentially activate and deactivate said motor phases;

a rotor assembly movable with respect to said stator assembly and including a rotor having a plurality of rotor poles;

means for energizing and de-energizing said stator windings as a function of rotor position, the respective outer ends of said stator and rotor poles being adjacent one another with an air gap formed therebetween, the width of said air gap being non-uniform about the circumference of said stator and rotor with said non-uniformity producing a waveform characteristic in resulting current and voltage waveforms of said motor, said waveform characteristic representing said rotor position; and, means for ascertaining said rotor position from processing one of said waveforms to determine when said stator windings are energized and de-energized, said means processing a waveform resulting from the coupling between an energized stator winding for an active motor phase and a de-energized stator winding for an inactive motor phase, the respective energized and de-energized stator windings being interconnected to form a closed winding path by which current and voltage in an energized stator winding is coupled into a de-energized stator winding.

35. The switched reluctance motor of claim 34 wherein said stator windings of one motor phase are connected together with said stator windings of said other motor phases and form a closed winding path, and a jumper wire is connected between respective stator windings to form a series-parallel winding path with said stator windings, said processing means ascertaining said waveform characteristic from a waveform produced by the coupling from an energized stator winding in said winding path into said de-energized stator windings therein.

* * * * *